J. C. RHODES.
Nicking Screw Blanks
No. 40,588.    Patented Nov. 10, 1863.
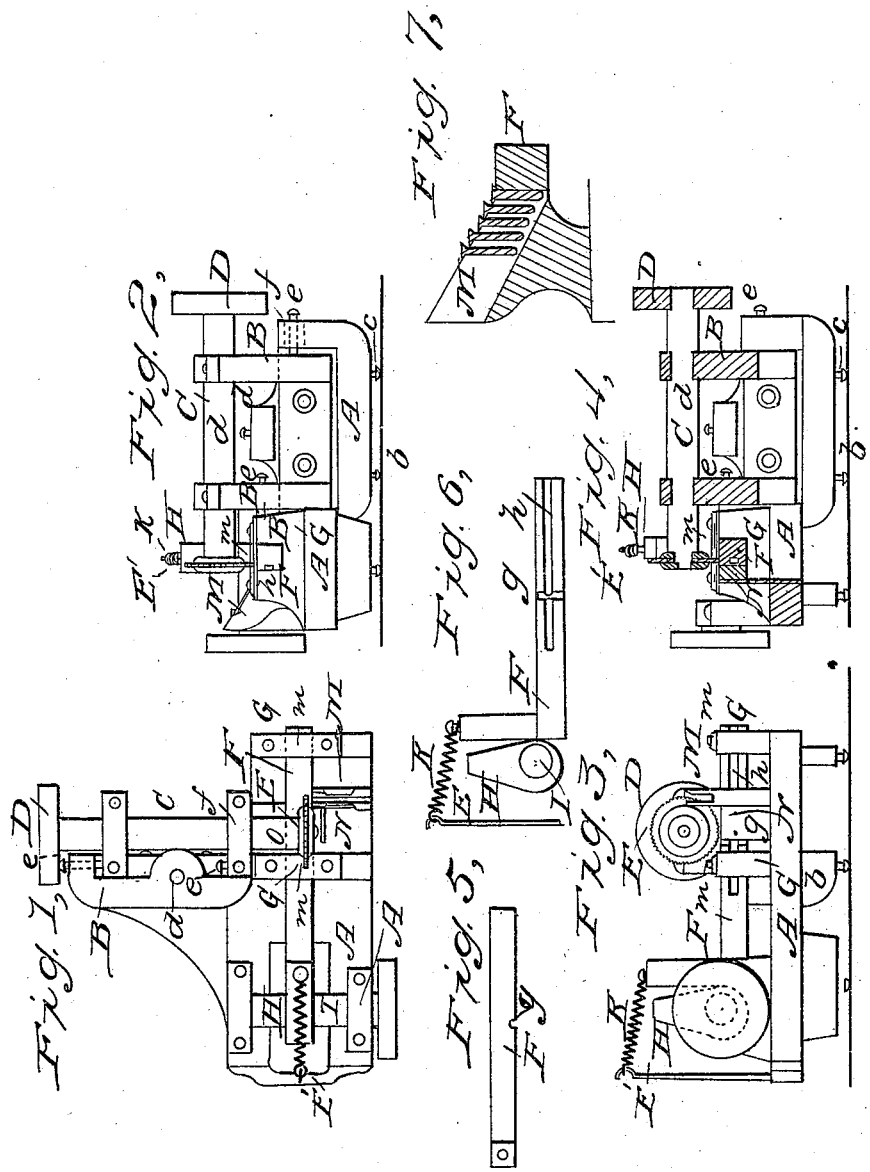

UNITED STATES PATENT OFFICE.

JOHN C. RHODES, OF EAST BRIDGEWATER, MASSACHUSETTS, ASSIGNOR TO B. HOBART & SON, OF SAME PLACE.

IMPROVEMENT IN SCREW-CUTTING MACHINES FOR NICKING SCREW-BLANKS.

Specification forming part of Letters Patent No. 40,588, dated November 10, 1863.

*To all whom it may concern:*

Be it known that I, JOHN C. RHODES, a resident of East Bridgewater, of the county of Plymouth and State of Massachusetts, have invented a new and useful Machine for Nicking Screw-Blanks; and I do hereby declare the same to be fully described in the following specification, and represented in the accompanying drawings, of which—

Figure 1 is a top view; Fig. 2, a front elevation; Fig. 3, an end elevation; Fig. 4, a vertical section taken in the plane of the axis of the shaft of the saw or cutter. Fig. 5 is a top view, and Fig. 6 a side elevation, of the blank receiver or carriage by which it is taken from the inclined feeder and transferred to the rotary saw or cutter. The said Fig. 6 also represents the spring and the cam for operating the carriage.

The nature of my invention is as follows—that is to say, it is a combination and construction of elementary parts, substantially as hereinafter described.

In the drawings, A denotes the frame of the machine. To this frame there is applied a secondary frame or stock, B, which supports in suitable boxes, $a\ a$, a rotary shaft, C, which on one end is provided with a rotary drum or driving-pulley, D, while to its other end it has affixed a rotary saw or cutter, E. The stock B is adjustible vertically as well as in directions toward and away from the blank-carriage F, the vertical adjustments being the three screws shown at $b\ c\ d$ in Fig. 2. The lateral adjustments are clamp-screws $e\ e$, which respectively extend through horizontal slots $f\ f$, (represented by dotted lines in Fig. 2,) made in the stock. The said clamp-screws are screwed into the frame A. By means of these adjustments the saw or cutter can be so adjusted as not only to cut diametrically through a screw-blank head of any size capable of being introduced into the machine, but it may be further adjusted so as to cut into the head to any required depth. Underneath the saw E there is the blank carrier or carriage F, which is supported within two standards, G G, and so as to be capable of being moved longitudinally within them, its movement in one direction or forward being effected by a cam, H, carried by a rotary shaft, I, arranged with respect to the carriage as shown in the drawings. A helical spring, K, affixed at one end to the carriage F and at the other to a standard or post, E', (elevated on the frame A,) serves not only to retract the carriage, but to enable it to move in an opposite direction whenever such may be necessary in consequence of the derangement of a screw-blank supported by the carriage. This carriage contains a recess or niche, $g$, which is made in its outer side, and leads upward out of a horizontal groove, $h$, also made within such side, as shown in the drawings. At one extreme of movement of the said niche or recess $g$ there is a feeder or trough, M, which, besides being inclined on its upper surface, stands at right angles to the carriage. The screw-blanks stand on this feeder, as shown in section in Fig. 7. They may be fed into it either by manual labor or by means of a hopper, the power of gravity causing them not only to assume vertical positions, but to descend and pass through the inclined feeder, each in succession, being received in the niche or recess $g$, and being transferred by the carriage to and under the saw so as to cause the latter, while in rotation, to saw or cut a nick across the upper surface of the head of the blank. A spring-presser, N, supported by the frame A, enters the groove $h$ and presses against the shank of the blank, so as to hold it within the niche, not only during the transit of the blank from the feeder to the saw, but while the latter may be making the nick. Above the carriage F and projecting from one of the caps $m\ m$ of the standards G G is a cam or discharger, O, whose office is to discharge the screw-blank immediately after the nick may have been made in it. During the retractive movement of the carriage F the blank will not only be carried beyond the presser, but against the discharger, and by the latter will be forced out of the niche, after which the carriage will be moved in an opposite direction, in order to receive another blank.

I claim as my invention—

The improved machine or combination, constructed in manner and so as to operate substantially as above described, such machine not only having an inclined feeding-trough, M, a blank receiver or carriage, F, a presser, N, a rotary saw or cutter, E, a discharger, O, and saw adjustments, substantially as hereinbefore described, but being provided with a spring, K, applied to the blank receiver or carriage so as not only to retract the latter, but to enable it to move in an opposite direction under derangement of a screw-blank, as set forth.

JOHN C. RHODES.

Witnesses:
H. C. WHIDDEN,
JOS. PETTIE, Jr.